United States Patent [19]

Mori

[11] Patent Number: 4,461,278
[45] Date of Patent: Jul. 24, 1984

[54] APPARATUS FOR COLLECTING AND TRANSMITTING SOLAR ENERGY

[76] Inventor: Kei Mori, 3-16-3-501, Kaminoge, Setagaya-ku, Tokyo, Japan

[21] Appl. No.: 361,892

[22] Filed: Mar. 25, 1982

[30] Foreign Application Priority Data

Apr. 2, 1981 [JP] Japan .................................. 56-49797

[51] Int. Cl.³ .............................................. G02B 5/14
[52] U.S. Cl. .................... 126/440; 126/417; 350/96.10; 350/96.15; 350/96.18
[58] Field of Search ............................. 126/440, 417; 350/96.18, 96.15, 96.10, 258, 259

[56] References Cited

U.S. PATENT DOCUMENTS 3,185,021 5/1965 Thompson .......................... 356/332
3,885,879 5/1975 Louder et al. ...................... 356/419
4,257,401 3/1981 Daniels .............................. 126/440
4,403,152 9/1983 Schmid et al. ................... 350/96.15

FOREIGN PATENT DOCUMENTS 14031 2/1979 Japan ................................. 126/440

Primary Examiner—Larry Jones
Assistant Examiner—Helen A. Odar
Attorney, Agent, or Firm—Burgess, Ryan & Wayne

[57] ABSTRACT

An apparatus for collecting and transmitting solar energy, which has lenses for collecting beams of sunlight and light guide cables or optical fiber cables for transmitting the collected beams. Light-receiving end faces of the light guides or the optical fibers are aligned with focal positions of light components of desired colors, respectively.

2 Claims, 7 Drawing Figures

APPARATUS FOR COLLECTING AND TRANSMITTING SOLAR ENERGY

BACKGROUND OF THE INVENTION

The present invention relates to an apparatus for collecting and transmitting solar energy and, more particularly, to an apparatus for collecting with a lens system light beams including light components for a predetermined purpose and transmitting these light beams through a light guide to a desired place so as to utilize the solar energy for the predetermined purpose.

Recently, effective utilization of solar energy has received great attention and extensive studies and further developments have been made in various fields. The mainstream of these developments is represented by conversion of solar energy to another form of energy such as thermal energy, electrical energy or the like and utilization of the energy in the converted form. However, it is also proposed that solar energy be directly utilized for a certain purpose. For example, the beam of sunlight may be focused with a lens system and led to a light guide, so that the light guide transmits the light beam to a desired place for illumination.

When sunlight is used for a special purpose, light components necessary for this purpose are preferably selectively collected and transmitted. For example, when solar energy is to be utilized for illuminating natural colors of clothes, white light which contains all components is preferably used.

Further, solar energy may be utilized for growing plants at the bottom of the sea. As a matter of fact, only bluish green light components reach the deep sea (100 m deep or more), and plants which grow with bluish green light components grow in the deep sea. On the other hand, since red light components are transmitted to the shallow sea (less than 100 m. deep), the plants which grow with red light components grow in the shallow sea. Therefore, if light which mainly includes more red light components is transmitted to the deep sea, shallow sea plants can be grown in the deep sea. On the other hand, if light which mainly contains bluish green light components is transmitted to the bottom of the shallow sea, deep sea plants can be grown there.

Further, artificial culture of spirula and chlorella with solar energy may be performed.

Solar energy may also be utilized for raising animals, improving a health condition, performing therapies, and as a fishing light source (green) for catching fish.

In these cases, all light components of solar energy are required for some purposes or specific light components thereof must be selected for others. Recently, light components of solar energy have often been utilized selectively. However, it is doubtful that desired light components are utilized effectively.

For example, when solar energy is focused with a Fresnel lens or the like and directed to a light guide, and the light guide transmits the beam of sunlight to a desired place for a specific purpose, focal positions of light components differ in accordance with their wavelength. The focal length of the red light components is long, while the focal length of the blue light components is short. In particular, when sunlight is focused with a Frensel lens of 35 cm in diameter, the diameter of the image becomes about 4 mm. Further, when light components of sunlight are to be led to a light guide of 4 mm in diameter, the spectral distribution of the sunlight coupled thereto changes according to which light component is selected to be correctly focused on a light-receiving end face of the light guide.

Therefore, if all the light components of sunlight focused with the lens system and directed to the light guide are transmitted, a beam of sunlight which contains desired light components cannot be obtained.

SUMMARY OF THE INVENTION

It is an object of the present invention to provide an apparatus for collecting a beam of sunlight which includes desired light components in a relatively great amount and for transmitting the beam of sunlight to a desired place.

It is another object of the present invention to provide an apparatus for collecting and transmitting solar energy wherein desired light components of various colors can be selectively transmitted in greater amounts.

According to the present invention, a lens system is used to focus the beam of sunlight. In order to transmit the focused beam, an optical fiber cable is used and one end thereof is positioned at a focal position of the lens. In order to select desired light components, one end of the optical fiber cable is positioned at the focal position of the lens which corresponds to the selected light component.

In order to selectively transmit light components of various colors with a single apparatus, a structure is adopted wherein one end of the optical fiber cable can be moved along an optical axis of light focused by the lens, and at the desired position can be fixed.

Further, when light components of a plurality of selected colors are to be transmitted simultaneouly, a cable which comprises a plurality of optical fibers is used. Each end face of the optical fibers is positioned at a corresponding focal position of the light component of the corresponding selected color.

Other objects, features, and advantages of the present invention will be apparent from the following description when taken in conjunction with the accompanying drawings.

DETAILED DESCRIPTION OF THE PREFERRED EMBODIMENTS

Figure 1:
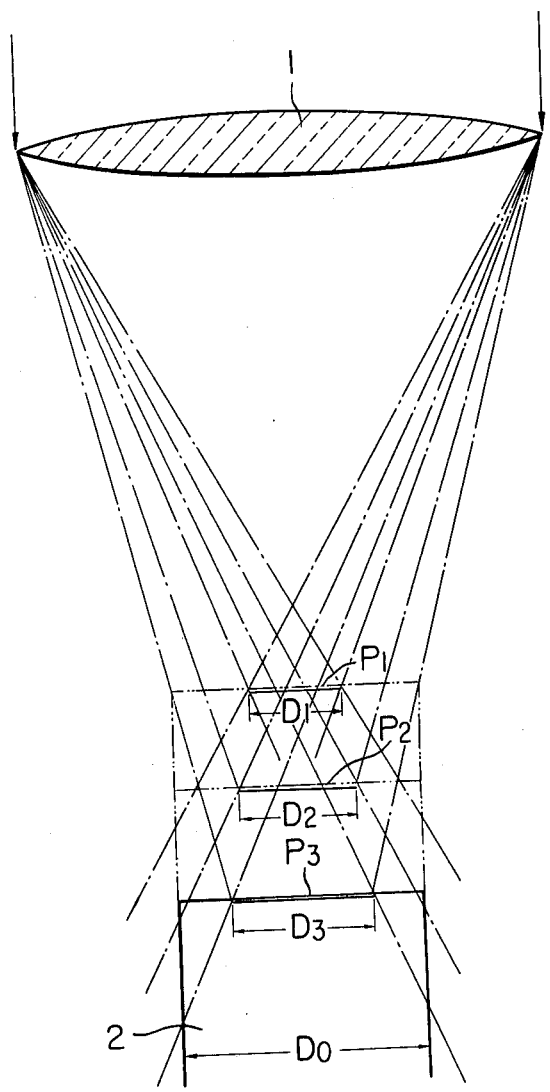
FIG. 1 is a transverse view of an optical system for collecting and transmitting solar energy according to one embodiment of the present invention.
Figure 2:
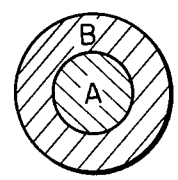
FIG. 2 shows an image of the sun focused with a lens system.

FIG. 1 is a view of an optical system of an apparatus for collecting and transmitting solar energy according to one embodiment of the present invention. Reference numeral 1 denotes a lens such as a Fresnel lens. Reference numeral 2 denotes a light guide which receives a beam of sunlight focused by the lens 1 and transmits the beam to a desired place. When the beam of sunlight is focused by the lens 1, an image of the sun has a central region A of substantially white light and a peripheral region B of the light component focused on this focal position, as shown in FIG. 2.

When sunlight is focused by the lens, the focal position and the size of the image of the sun may vary with wavelength. For example, with blue light components which have short wavelengths, the image of the sun is focused at a position $P_1$ and has a diameter $D_1$. With green light components which have intermediate wavelengths, the image of the sun is focused at a position $P_2$ and has a diameter $D_2$. Further, with red light components which have long wavelengths, the image of the sun is focused at a position $P_3$ and has a diameter $D_3$.

Therefore, if the light-receiving end face of the light guide 2 is positioned at the position $P_1$, the light beam which contains the blue light components at the peripheral region B can be transmitted. If the light-receiving end face of the light guide 2 is positioned at the position $P_2$, the light beam which contains the green light components at the peripheral region B can be transmitted. Further, when the light-receiving end face of the light guide 2 is positioned at the position $P_3$, the light beam which contains the red light components at the peripheral region B can be transmitted. In this case, if the diameter of the light guide is selected to be the diameter $D_1$ for blue, the diameter $D_2$ for green and the diameter $D_3$ for red, the cross sectional area of the light guide is minimized for optimal transmission of the light beam which contains desired light components in a great amount. Alternatively, as shown in FIG. 1, the diameter of the light-receiving end face of the light guide 2 may be enlarged to a diameter $D_0$ for transmitting all light components of the beam.

The light-receiving end face of the light guide may be aligned with the focal position of the lens in the manufacturing process at the factory. Further, the light-receiving end face of the light guide may be adjustable along the optical axis of the lens allowing, the user to adjust the position of the light-receiving end face and fix it at a desired position in accordance with the light components of the desired color.

As described above, when sunlight is focused by the lens 1, white light containing all components impinges on the central region A. However, the peripheral region B is irradiated with different light components in accordance with the distance between the light-receiving end face and the focal position. If the focal position of the light component is close to the lens 1, the peripheral region B is radiated with the blue light components. On the other hand, if the focal position of the light component is apart from the lens 1, the peripheral region B is radiated with the red light components.

The area of the peripheral region B is larger than that of the central region A. Light energy impinging on the peripheral region B cannot be neglected. Further, the light component of the selected color impinges on the peripheral region B. Thus, if the light components impinging on the peripheral region B are effectively used, enhanced effects are obtained for a specific purpose.

Figure 3:
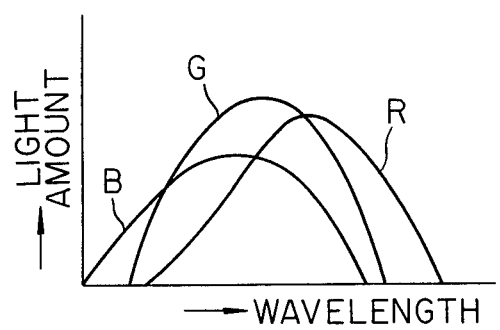
FIGS. 3 to 5 are graphs showing spectral distributions of solar light with relative intensity plotted as a function of wavelength.
Figure 4:
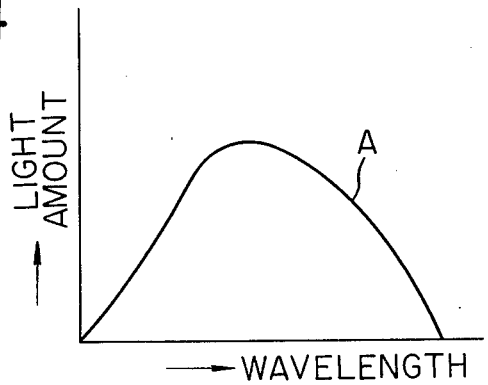
Figure 5:
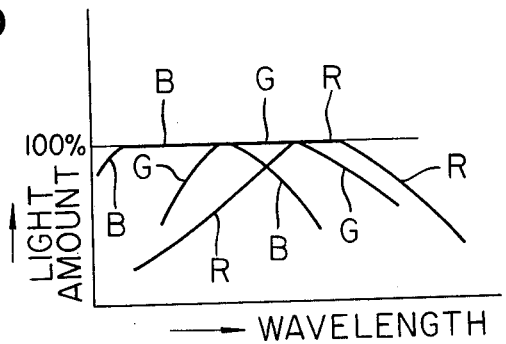

FIG. 3 is a graph representing the spectral distribution of sunlight. Reference symbol B denotes the spectral distribution of blue light components; G, the spectral distribution of green light components; and R, the spectral distribution of red light components. As described above, when a light guide of diameter $D_0$ is used, light containing substantially all components is obtained, as indicated by a curve A in FIG. 4. When the light-receiving end face of the light guide of the diameter $D_1$ is positioned at the position $P_1$, the blue light component of the beam is obtained as indicated by a curve B of FIG. 5. Further, when the light-receiving end face of the light guide of the diameter $D_2$ is positioned at the position $P_2$, the green light component of the beam as indicated by a curve G is obtained. When the light-receiving end face of the light guide of the diameter $D_3$ is positioned at the position $P_3$, the red light component of the beam as indicated by a curve R in FIG. 5 is obtained.

Figure 6:
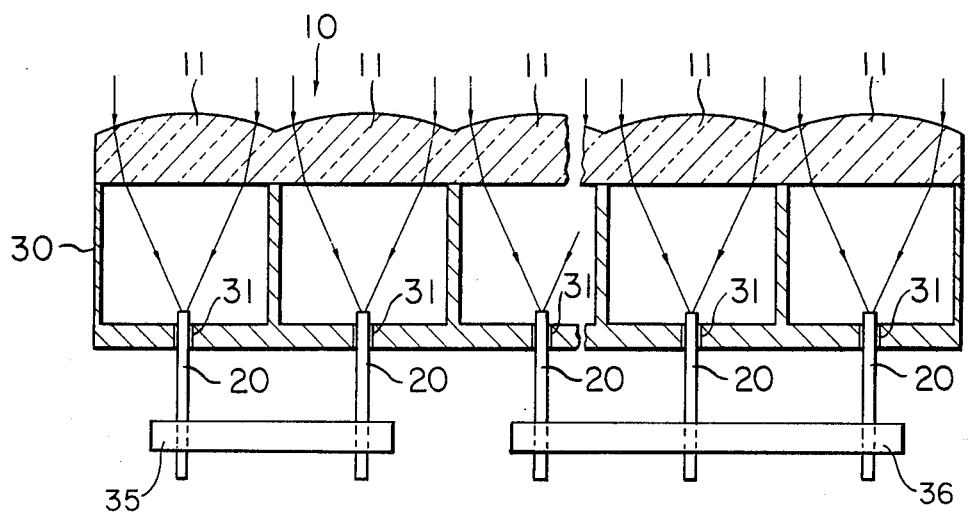
FIG. 6 is a schematic sectional view of the main part of an apparatus for collecting and transmitting solar energy according to another embodiment of the present invention.
Figure 7:
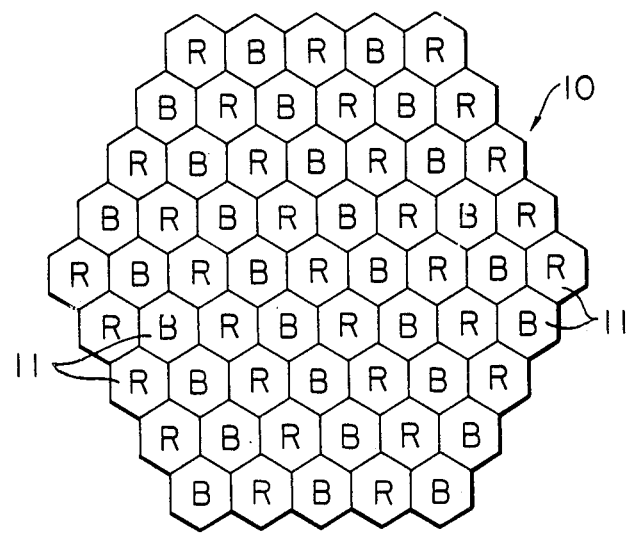
FIG. 7 is a plan view of the apparatus shown in FIG. 6.

FIG. 6 is a schematic sectional view of the main part of an apparatus for collecting and transmitting solar energy according to another embodiment of the present invention and FIG. 7 is a plan view thereof. Reference numeral 10 denotes lens arrays each comprising a number of small lenses 11 of 4 cm in diameter which collect solar energy. Reference numeral 20 denotes optical fibers of 0.2 mm in diameter which are respectively disposed in alignment with the small lenses 11. Reference numeral 30 denotes a holding member for holding lenses 11 and the optical fibers 20.

Each lens array 10 comprises a number of small lenses 11 which are disposed integrally therewith in the embodiment shown in FIG. 7. However, the lens array 10 may be fabricated by integrally adhering small lenses 11 with an adhesive or the like. Alternatively, separate small lenses 11 may be used for the above arrangement.

Further, the holding member 30 may include one portion which holds lenses and another portion which holds optical fibers. Holes 31 are formed in the vicinity of the focal position of each lens 11 of the holding member 30. After the lenses 11 are fixed on the holding member 30, parallel light beams impinging on the lenses 11 are focused on the axes of the holes 31, respectively. However, the focal positions of said focused light beams vary in accordance with wavelength. Therefore, the optical fibers 20 are respectively inserted into the holes 31 and the focal positions of the light components are respectively determined. The optical fibers 20 are respectively fixed at the respective focal positions of the light components. Thus, the light component of a desired color is introduced to each corresponding optical fiber 20.

With the apparatus for collecting and transmitting solar energy according to the present invention, when a light source for culture of chlorella is to be provided, the end faces of the optical fibers (e.g., optical fibers corresponding to lenses R, as shown in FIG. 7) are aligned in a predetermined number with the focal position of the red light components and the end faces of the rest of the optical fibers (optical fibers corresponding to lenses B, as shown in FIG. 7) are aligned with the focal positions of the blue light components, since the blue and red light components are especially required for culture of chlorella as described above. The other ends of the optical fibers are disposed to illuminate a culture tank of chlorella. Thus, only the light components suitable for culture of chlorella are transmitted.

FIG. 7 shows an example of the structure wherein small lenses are aligned in an area corresponding to that of a Fresnel lens of 35 cm diameter. Referring to the figure, if regular hexagonal lenses 11 are used, the greatest number of lenses are arranged in the unit area. For example, if the length of the diagonal line of each lens 11 is 4 cm, sixty-one lenses 11 can be effectively arranged.

The lens arrays 10 which are formed by the regular hexagonal lenses 11 are arranged substantially in a regular hexagonal shape, as shown in FIG. 7. If the lens arrays 10 of FIG. 7 are defined as a unit, a number of units (e.g., 7 or 19 units) constitute a large apparatus for collecting and transmitting solar energy. Further, if units transmit different light components, desired units may be selectively used as needed.

As described above, regular hexagonal lenses are used for an optimal arrangement. However, a round or rectangular lens may alternatively be utilized. Each small lens may be a Fresnel or spherical lens. In the embodiment as shown in FIGS. 6 and 7, a great number of light guides is employed and the proper alignment of the light-receiving end face of each light guide with each focal position of the lens is time-consuming and cumbersome. Therefore, the specifications of the apparatus are determined for specific applications in advance. The light-receiving end faces of the light guides are fixed at the focal positions of the lenses in the manufacturing process, respectively, in order to eliminate the time-consuming adjustment operation by the user. Alternatively, the light guides for receiving the red light components may be supported by a single base 35 and the light guides which receive the blue light components may be supported by another single base 36. These bases may then be arranged to be adjustable along the optical axes of the lenses.

What is claimed is:

1. Apparatus for collecting and transmitting solar energy, comprising:

frame means having a plurality of parallel holes therein lens means, mounted on said frame means for focusing solar light within said frame means on the axis of each of said holes a light guide cable comprising a multiplicity of optical fibers, each of said fibers having a light-receiving end face and a light-radiating end face, said light-radiating end faces being disposed so as to illuminate a desired region remote from said frame;

a first group of said optical fibers having light-receiving end faces extending into one or more of said holes;

means for adjusting the positions of said light-receiving end faces of said first group of optical fibers along the axis of each corresponding hole so that light of a first selected spectral distribution is focused thereon;

a second group of said optical fibers having light-receiving end faces extending into one or more of said holes;

means for adjusting the positions of said light-receiving end faces of said second group of optical fibers along the axis of each corresponding hole, in a plane different from that at which the light receiving end faces of said first group of optical fibers is positioned, so that light of a second selected spectral distribution is focused thereon;

the optical fibers of said first and second groups being interspersed in said light guides cable, whereby said desired region is illuminated with light comprising a composite of said first and second spectral distributions.

2. An apparatus according to claim 1, wherein the area of the light-receiving end faces of said light guide cable extending into each hole is substantially equal to the cross sectional area of a focus of the light component of the selected spectral distribution thereat.

* * * * *